(12) United States Patent
Matsuguma et al.

(10) Patent No.: US 8,447,143 B2
(45) Date of Patent: May 21, 2013

(54) IMAGE PROCESSING APPARATUS AND STORAGE MEDIUM STORING IMAGE PROCESSING PROGRAM

(75) Inventors: Chihiro Matsuguma, Kanagawa (JP);
Hiroyoshi Uejo, Kanagawa (JP);
Kazuhiro Ohya, Kanagawa (JP);
Katsuya Koyanagi, Kanagawa (JP);
Shintaro Adachi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 256 days.

(21) Appl. No.: 13/008,343

(22) Filed: Jan. 18, 2011

(65) Prior Publication Data

US 2012/0038659 A1 Feb. 16, 2012

(30) Foreign Application Priority Data

Aug. 12, 2010 (JP) ................................. 2010-180984

(51) Int. Cl.
*G06K 9/03* (2006.01)
(52) U.S. Cl.
USPC ........... 382/310; 382/167; 382/190; 382/274; 358/3.26; 358/3.27
(58) Field of Classification Search
USPC ................. 382/164, 165, 167, 190, 274, 275, 382/310; 358/3.26, 3.27, 463
See application file for complete search history.

(56) References Cited

U.S. PATENT DOCUMENTS

| | | | | |
|---|---|---|---|---|
| 5,687,253 | A * | 11/1997 | Huttenlocher et al. | 382/177 |
| 6,249,604 | B1 * | 6/2001 | Huttenlocher et al. | 382/174 |
| 6,874,420 | B2 * | 4/2005 | Lewis, Jr. et al. | 101/485 |
| 7,006,881 | B1 * | 2/2006 | Hoffberg et al. | 700/83 |
| 7,124,041 | B1 * | 10/2006 | Johnson et al. | 702/58 |
| 7,128,270 | B2 * | 10/2006 | Silverbrook et al. | 235/472.01 |
| 7,305,105 | B2 * | 12/2007 | Chosson et al. | 382/100 |
| 7,358,502 | B1 * | 4/2008 | Appleby et al. | 250/370.14 |
| 7,813,822 | B1 * | 10/2010 | Hoffberg | 700/94 |
| 7,856,248 | B1 * | 12/2010 | Fujisaki | 455/556.1 |
| 2002/0015525 | A1 | 2/2002 | Fujiwara | |
| 2007/0237394 | A1 | 10/2007 | Fujiwara | |

FOREIGN PATENT DOCUMENTS

| | | |
|---|---|---|
| JP | A-2001-358925 | 12/2001 |
| JP | A-2006-203582 | 8/2006 |
| JP | A-2006-203583 | 8/2006 |

\* cited by examiner

*Primary Examiner* — Yosef Kassa

(74) *Attorney, Agent, or Firm* — Oliff & Berridge, PLC

(57) ABSTRACT

An image processing apparatus that includes a character recognition component, a determining component and a generating component is provided. The determining component determines, when document data is generated that contains first data representing the document and representing the entity in which the characters are mixed and second data containing character code data of the characters recognized by the character recognition component and representing a character block displaying the characters represented by the character code data, whether to hide the character block represented by the second data behind the entity represented by the first data or to display the character block represented by the second data in front of the entity represented by the first data when the document represented by the document data is displayed, based on lightness or distribution of the lightness of a background region around the characters of the entity or the like.

15 Claims, 12 Drawing Sheets

FRONT-SIDE ARRANGEMENT OF CHARACTER BOX

BACK-SIDE ARRANGEMENT OF CHARACTER BOX

CHARACTER BOX ARRANGED IN BACK-SIDE LAYER (OUTWARD APPEARANCE IS IMPROVED WITH ARRANGEMENT OF CHARACTER BOX ON BACK SIDE)

FIG.12A
ORIGINAL DOCUMENT (PHOTO OBJECT IN WHICH CHARACTERS ARE MIXED)

FIG.12B
CHARACTER BOX FRONT-SIDE ARRANGEMENT + COLORED BACKGROUND

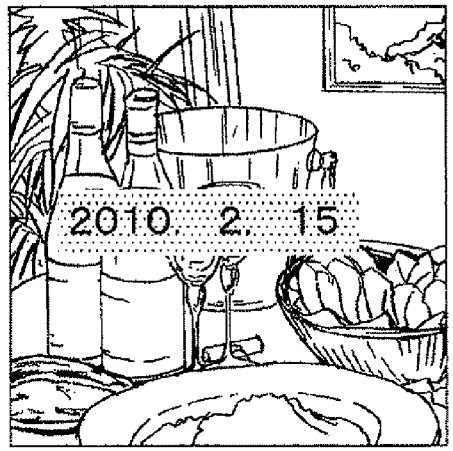

(OUTWARD APPEARANCE BECOMES WORSE IF BACKGROUND COLOR OF CHARACTER BOX IS NOT APPROPRIATE)

FIG.12C
CHARACTER BOX FRONT-SIDE ARRANGEMENT + TRANSPARENT BACKGROUND

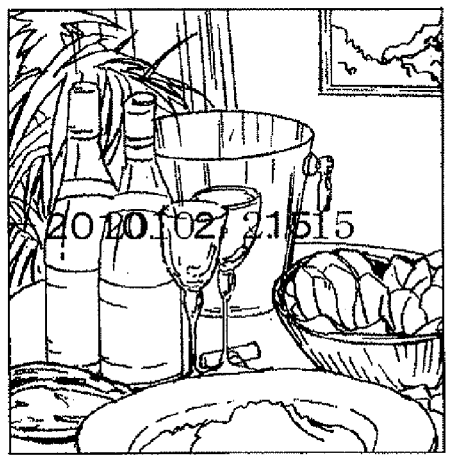

(OUTWARD APPEARANCE BECOMES WORSE IF FONT TYPES OR FONT SIZES DO NOT MATCH)

FIG.12D
CHARACTER BOX BACK-SIDE ARRANGEMENT

(OUTWARD APPEARANCE IS IMPROVED WITH CHARACTER BOX ARRANGEMENT ON BACK SIDE)

IMAGE PROCESSING APPARATUS AND STORAGE MEDIUM STORING IMAGE PROCESSING PROGRAM

CROSS-REFERENCE TO RELATED APPLICATIONS

This application is based on and claims priority under 35 USC 119 from Japanese Patent Application No. 2010-180984 filed on Aug. 12, 2010.

BACKGROUND

1. Technical Field

The invention relates to an image processing apparatus and a storage medium storing an image processing program.

2. Related Art

There exists a technique in which a synthesizing image is generated based on a multiple value image data. In the synthesizing image, image data from which characters are removed and the characters that are coded are overlapped.

SUMMARY

According to an aspect of the present invention, an image processing apparatus is provided. The image processing apparatus includes: a character recognition component that performs character recognition on characters mixed in an entity based on image data obtained by reading, as an image, a document containing entities in which characters are mixed; a determining component that determines, when document data is generated that contains first data representing the document and representing the entity in which the characters are mixed and second data containing character code data of the characters recognized by the character recognition component and representing a character block displaying the characters represented by the character code data, whether to hide the character block represented by the second data behind the entity represented by the first data or to display the character block represented by the second data in front of the entity represented by the first data when the document represented by the document data is displayed, based on at least one of lightness or distribution of the lightness of a background region around the characters of the entity, a number of characters or a number of lines of the characters in the entity, lightness of a region of the characters in the entity, accuracy of the character recognition by the character recognition component, a size of the characters in the entity, or a type of the entity; and a generating component that generates the document data for which a front/back relationship of a display between the character block and the entity when the document is displayed has been set according to a determination result of the determining component.

BRIEF DESCRIPTION OF THE DRAWINGS

Exemplary embodiments of the present invention will be described in detail based on the following figures, wherein:

FIGS. 12A to 12D are conceptual diagrams illustrating the front side/back side determination of the character box based on the lightness of background color of characters and distribution of the background lightness.

DETAILED DESCRIPTION

Figure 1:
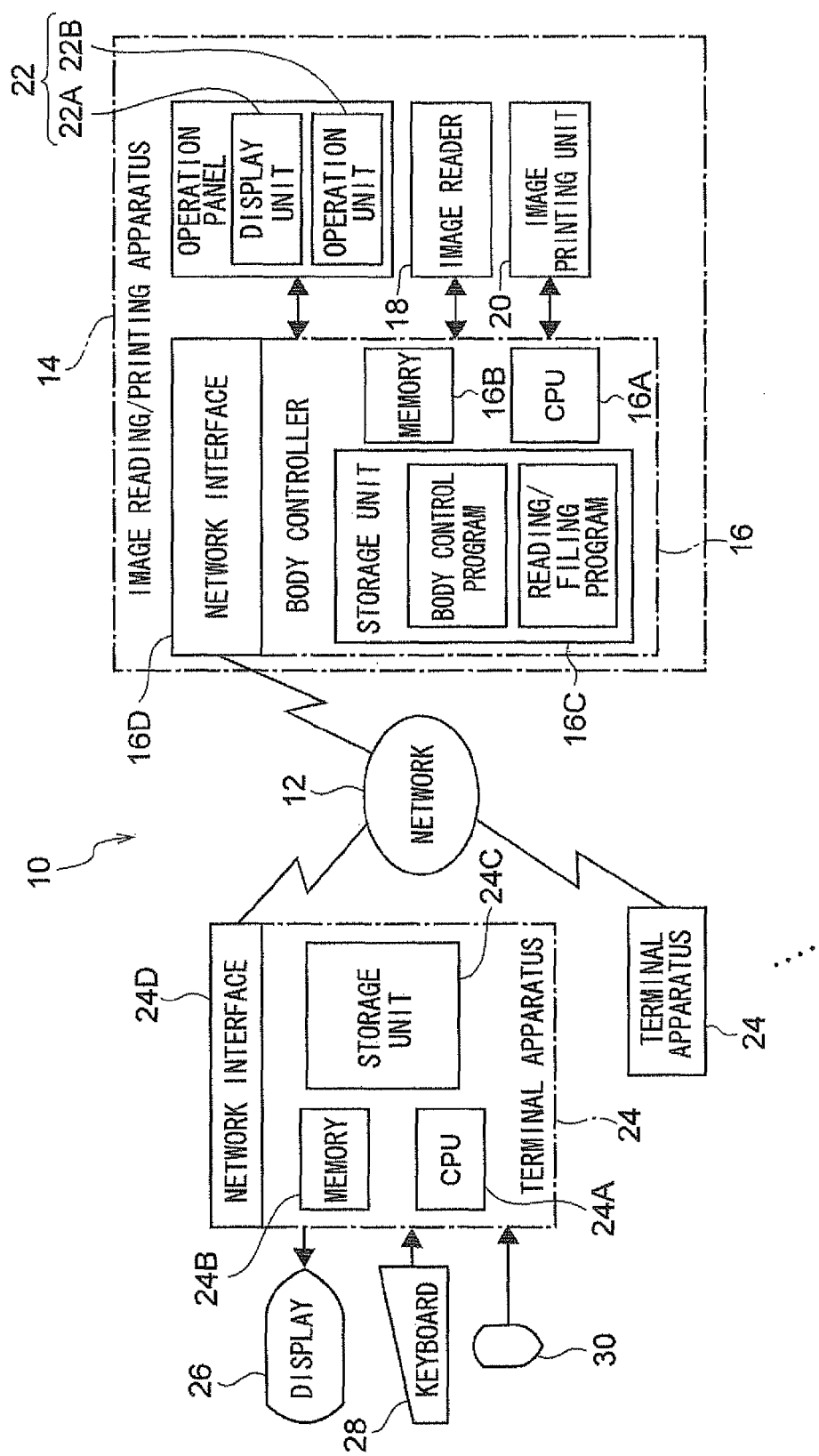
FIG. 1 is a block diagram showing an overview configuration of a computer system according to an exemplary embodiment.

An example of the exemplary embodiment of the invention will be described in detail below with reference to drawings. FIG. 1 shows an overview configuration of a computer system 10 according to the present exemplary embodiment. The computer system 10 is configured by an image reading/printing apparatus 14 and plural terminal apparatuses 24 composed of PCs (Personal Computers) or the like being connected to a network 12 composed of LAN or the like.

The image reading/printing apparatus 14 may be configured by an apparatus that combines the function as a copying machine, the function as a printer, and the function as a scanner and includes a body controller 16 composed of a microcomputer or the like and containing a CPU 16A, a memory 16B, a nonvolatile storage unit 16C composed of an HDD (Hard Disk Drive), flash memory or the like, and a network interface unit 16D. Also, an image reader 18 that optically reads a set document (paper original document) to be read and outputs the read image data, an image printing unit 20 that prints an image represented by input print image data on recording paper, an operation panel 22 provided with a display unit 22A composed of an LCD or the like and an operation unit 22B composed of a ten-key, touch panel and the like are each connected to the body controller 16.

The network interface unit 16D of the body controller 16 is connected to the network 12 to control communication with the terminal apparatuses 24 via the network 12. A body control program to provide various services (for example, copying of a document and printing (printing of a document represented by document data received from the terminal apparatus 24)) to the user by controlling the operation of each unit of the image reading/printing apparatus 14 and a reading/filing program to perform reading/filing processing described later by the CPU 16A are each installed in the storage unit 16C of the body controller 16 as programs executed by the CPU 16A.

The above reading/filing program is an exemplary image processing program according to the present invention and in the present exemplary embodiment, with the reading/filing program being executed by the CPU 16A of the body controller 16 of the image reading/printing apparatus 14, the image reading/printing apparatus 14 functions as an image processing apparatus according to the present invention.

Each of the terminal apparatuses 24 includes a CPU 24A, a memory 24B, a nonvolatile storage unit 24C composed of an HDD (Hard Disk Drive), flash memory or the like, and a network interface unit 24D and is connected to the network 12 via the network interface unit 24D. Also, a display 26, a keyboard 28, and a mouse 30 are connected to the terminal apparatus 24.

Figure 2:
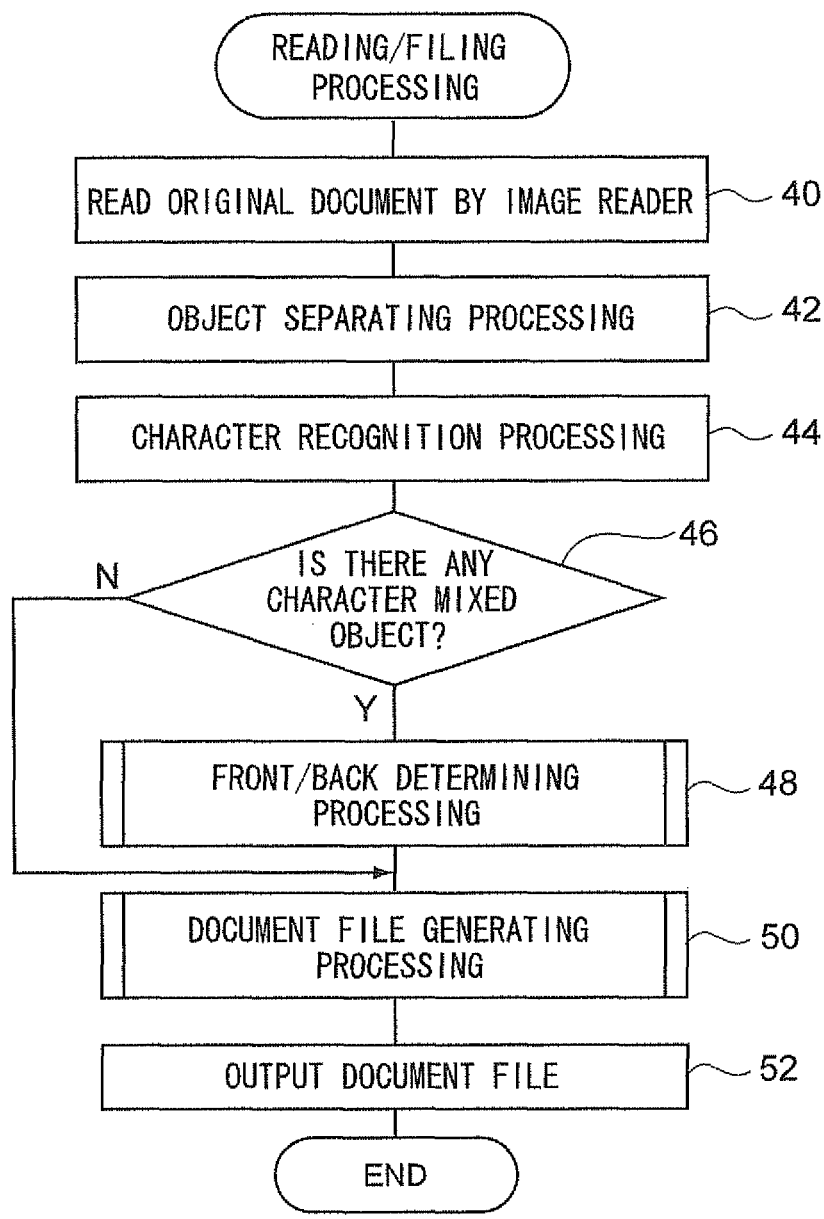
FIG. 2 is a flow chart showing content of reading/filing processing.

Next, as an operation of the present exemplary embodiment, reading/filing processing realized by the reading/filing program being executed by the CPU 16A of the body controller 16 of the image reading/printing apparatus 14 will be described with reference to FIG. 2. The reading/filing processing is performed when the user issues instructions to read an original document (document) and generate/output (execution of a "Scan to File" service) a document file of the original document (document) based on reading results via the operation unit 22B of the operation panel 22 while the original document (document) to be read is set to the image reader 18.

In the reading/file output processing, first in step 40, an original document (document) set to the image reader 18 is read by the image reader 18 as an image and image data (image data in, for example, bitmap format) representing document reading results obtained by the reading is stored in the storage unit 16C. In step 42 that follows, object separating processing that separates/extracts various objects (entities) such as characters, photos, illustrations (CG), tables, and line drawings from the image of the read document based on the image data stored in the storage unit 16C is performed.

The object separating processing may be realized by, for example, as disclosed by Japanese Patent Application Laid-Open (JP-A) No. 2006-203582 or JP-A No. 2006-203583, applying a technology that divides an image into plural blocks, classifies each block into one of the plural blocks (for example, "color pattern block", "color character and perimeter ground block", "monochrome pattern block", "monochrome character and perimeter ground block", "monochrome ground block", and "unknown attribute block") based on shapes of histograms of L*, a*, and b* in the L*a*b* color space created for each block or variances or average values of L*, a*, and b* for each block, and integrates adjacent blocks classified into the same category into a single region to separate the image of the read document into plural regions (entities) whose categories are mutually different.

Figure 6:
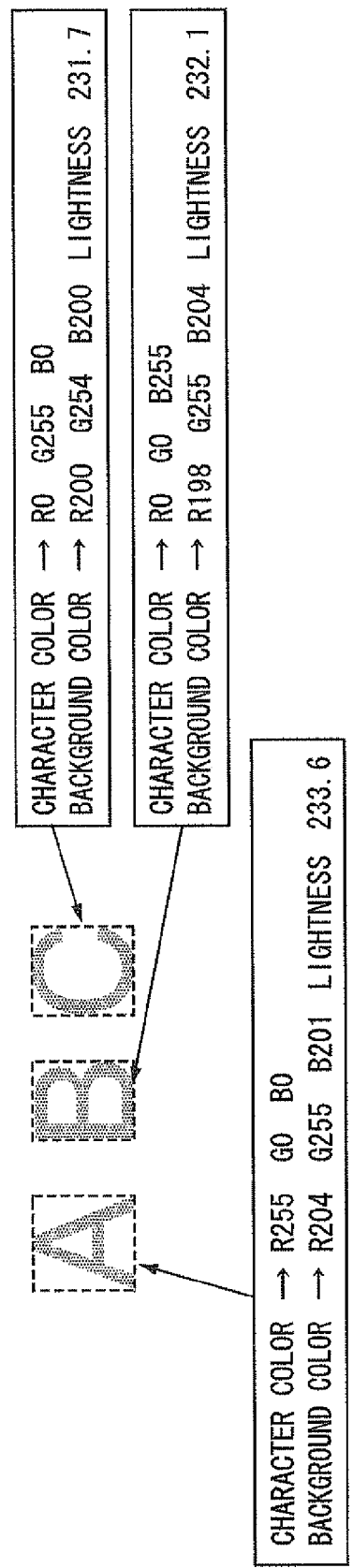
FIG. 6 is an image diagram illustrating determinations of character colors and background colors in character recognition processing.

In step 44, character recognition processing that determines character code data, the font type, the font size, positions and the like of an extracted character by searching for a character present in an object of individual objects separated from the image of the read document by the object separating processing of step 42 and performing pattern matching on the character extracted from the search. Accordingly, not only characters present in the object type "character" of an object whose object type is "character" (object composed of only characters), but also characters mixed in an object whose object type is other than "character" such as "photo", "CG", and "table" are recognized so that their character code data, font type, font size and the like are determined. In the character recognition processing, as shown in FIG. 6 as an example, the color of character and that of a background region (the color of a region other than the character inside a rectangular region enclosing each character) are also determined for each character.

In step 46, based on a result of the character recognition processing in step 44, whether an object whose object type is other than "character" and in which a character is mixed (an object from which a character is extracted in the character recognition processing) is present is determined. If this determination is negative, the processing proceeds to step 50 and, if the determination in step 46 is affirmative, the processing proceeds to step 48. In this case, when a document represented by a document file is displayed, front/back determining processing that determines which of the object in which a character is mixed and a character box (example of a character block according to the present invention) displaying characters recognized in the character recognition processing to arrange on the front side is performed before proceeding to step 50. The front/back determining processing will be described later. In step 50, document file generating processing that generates a document file representing the read document is performed and the document file generating processing will also be described later. Then, in step 52, the document file generated in the document file generating processing is transferred to a transfer destination (for example, the terminal apparatus 24 operated by the user) specified in advance by the user or output by transmission after being attached to an e-mail before the reading/file output processing is terminated.

Incidentally, according to a technology described in Japanese Patent Application Laid-Open No. 2001-358925, character recognition of characters mixed in an image is performed and the characters are removed from the image and then, a composite image in which characters represented by character code recognized by the character recognition are arranged on the front side of the image from which the characters have been removed is output. However, according to this technology, if the image (character mixed object) of a portion from which a character is removed is a photo image, it is difficult to set the color and density of the portion from which a character is removed in such a way that unnaturalness should not arise in the photo image, which makes usability of a character mixed object (photo image) lower. Moreover, depending on the size of characters mixed in an image (character mixed object), number of characters, number of lines, or accuracy of character recognition of the characters, characters arranged on the front side of the character mixed object (photo image) and a portion from which characters of the character mixed object (photo image) have been removed may be misaligned.

Figure 3:
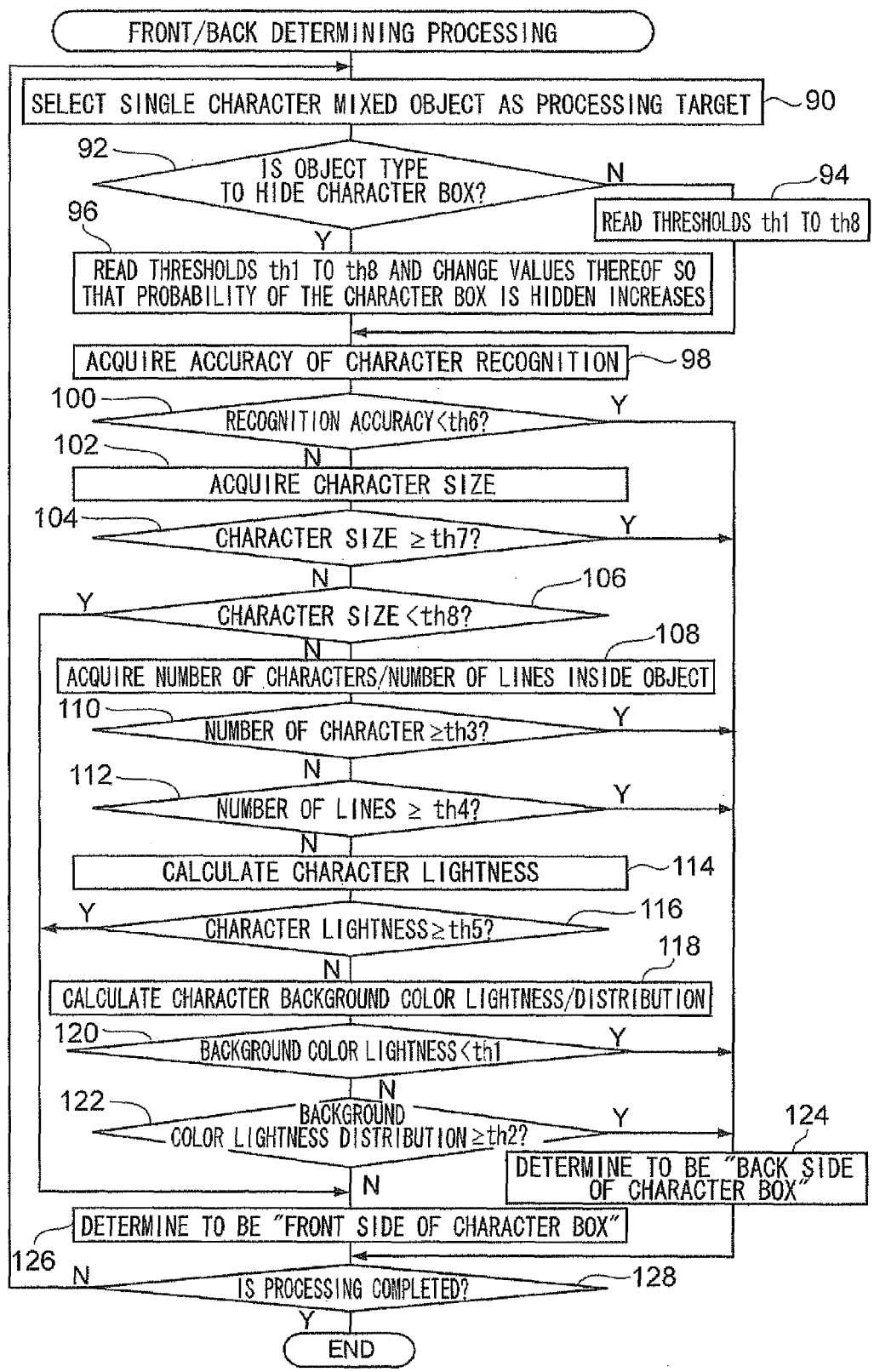
FIG. 3 is a flow chart showing content of front/back determining processing.

In the front/back determining processing according to the present exemplary embodiment, when a document represented by a document file is displayed, which of a character mixed object and a character box to arrange on the front side is determined in consideration of the above and the front/back determining processing according to the present exemplary embodiment will be described below with reference to FIG. 3. First in step 90, a single object which is character mixed object (object from which characters are extracted in the character recognition processing in step 44 of the filing processing (FIG. 2)) and on which processing in step 90 and thereafter is not performed is selected from among objects separated/extracted from a read document in the object separating processing in step 42 of the reading/filing processing (FIG. 2) as a character mixed object to be processed.

In step 92 that follows, whether the character mixed object to be processed is of object type to hide the character box. In the present exemplary embodiment, determination criteria information showing determination criteria used for the front/back determination (determination of which of the character mixed object and character box to arrange on the front side) on the front/back determining processing is stored in the storage unit 16C and the determination criteria information contains arrangement rule information that provides which of the back side and the front side of a character mixed object is desirable for the arrangement position of the character box for each object type. The determination in step 92 is realized by checking the object type of the character mixed object to be processed against the arrangement rule information to determine whether the desired arrangement position of the character box is the "back side" of the object type of the character mixed object to be processed.

Figure 7:
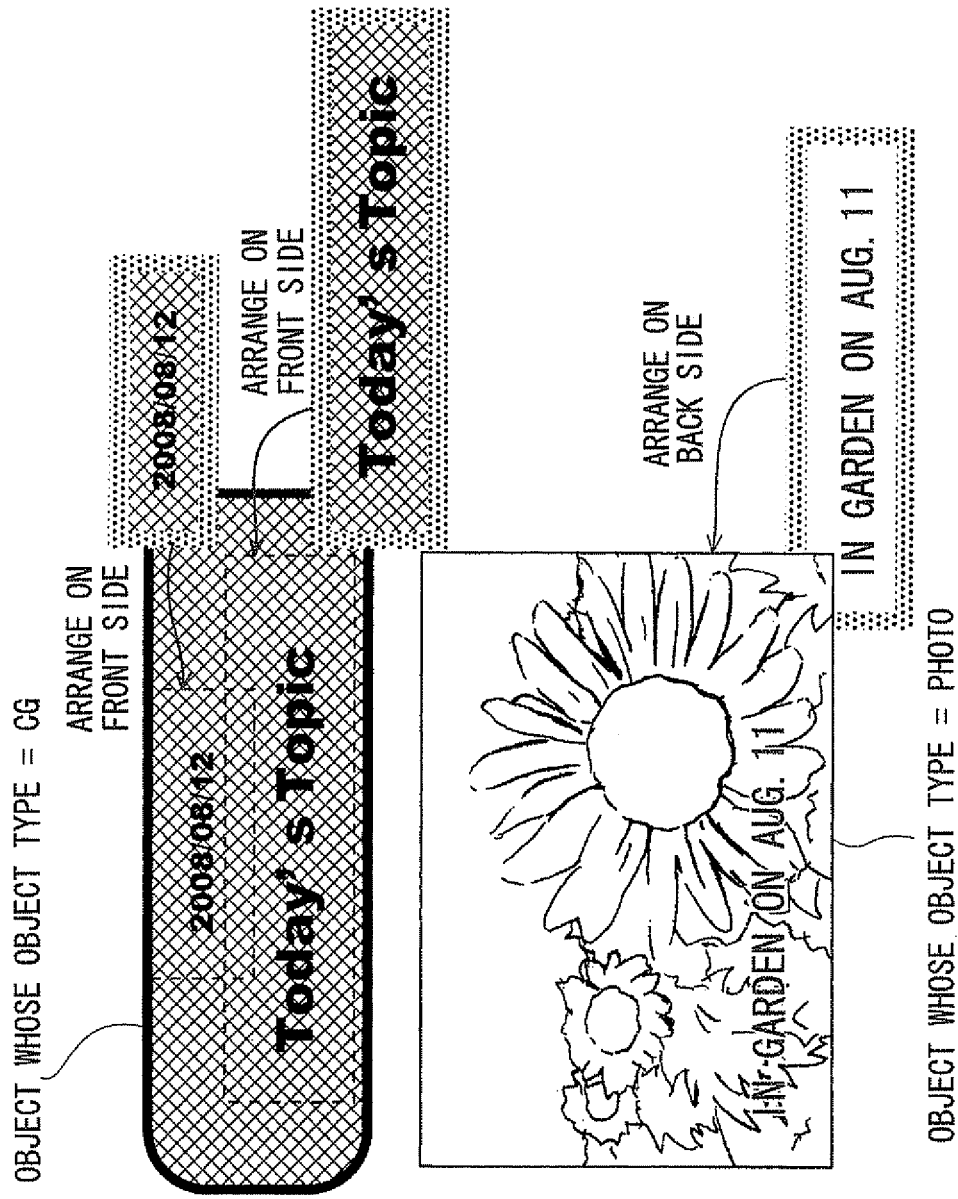
FIG. 7 is a conceptual diagram illustrating a front side/back side determination (threshold change) of a character box based on an object type of a character mixed object.

As shown in FIG. 7 as an example, a character mixed object whose object type is "CG" frequently has a single color as the background color of characters and if a character block (for example, as shown in FIG. 7, a character block displaying a character string of "Dec. 8, 2008" and a character block displaying a character string of "Today's Topic") is arranged on the front side of a character mixed object of this type, the outward appearance thereof will not become worse so that reusability of character code data of a character string displayed in the character block is improved by arranging the character block on the front side. On the other hand, as shown similarly in FIG. 7, a character mixed object whose object type is "photo" has a variety of colors/lightness (density) as the background color of characters and if a character block (for example, as shown in FIG. 7, a character block displaying a character string of "Taken in garden on August 11") is arranged on the front side of a character mixed object of this type, the outward appearance thereof will become worse.

Thus, initial values (default values) of the arrangement rule information are set in such a way that, for example, the desirable arrangement position of a character box is the "front side" for a character mixed object whose object type is "CG", and the desirable arrangement position of a character box is the "back side" for a character mixed object whose object type is "photo". In the present exemplary embodiment, content of the arrangement rule information is changeable by the user (details will be described later).

The above determination criteria information contains eight types of determination thresholds th1 to th8 and if the determination in step 92 is negative, the processing proceeds to step 94 to read the determination thresholds th1 to th8 from the storage unit 16C and to cause the memory 16B to store the determination thresholds th1 to th8 before proceeding to step 98. On the other hand, if the determination in step 92 is affirmative, the processing proceeds to step 96 to read the determination thresholds th1 to th8 from the storage unit 16C and to cause the memory 16B to store the determination thresholds th1 to th8. Then, the value of a determination threshold of the determination thresholds th1 to th8 determined to be the "back side" when the value of some parameter is equal to the determination threshold or more is decreased and the value of a determination threshold determined to be the "back side" when the value of some parameter is less than the determination threshold is increased before proceeding to step 98. Accordingly, values of the determination thresholds th1 to th8 are changed so that the probability of the character box being hidden on the back side of a character mixed object to be processed becomes higher than when the determination in step 92 is negative.

Step 92 to step 96 are an example of processing by a determining unit according to an eighth aspect. Instead of processing of steps 94 and 96 described above, if the desirable arrangement position of a character box provided in the arrangement rule information is the "back side", the determination thresholds th1 to th8 stored in the storage unit 16C may be used as they are, if the desirable arrangement position of a character box provided in the arrangement rule information is the "front side", values of the determination thresholds th1 to th8 stored in the storage unit 16C may be changed in such a way that the probability of the character box being arranged on the front side of a character mixed object to be processed becomes higher, and if the desirable arrangement position of a character box provided in the arrangement rule information is the "back side" and the "front side", value of the determination thresholds th1 to th8 stored in the storage unit 16C may be changed individually (changed in the opposite direction).

In step 98, the accuracy of character recognition calculated in the character recognition processing (step 44 in FIG. 2) on characters mixed in a character mixed object to be processed is acquired. The accuracy of character recognition is calculated individually for each character and thus, in step 98, the accuracy of character recognition for all characters mixed in the character mixed object to be processed is individually acquired and then, an average value of acquired accuracies is calculated or the minimum value of acquired accuracies is calculated as the accuracy of character recognition for the character mixed object to be processed. In step 100 that follows, whether the accuracy of character recognition for the character mixed object to be processed acquired in step 98 is less than the determination threshold h6 concerning the accuracy of character recognition of the eight determination thresholds th1 to th8 stored in the memory 16B. In the present exemplary embodiment, the determination threshold th6 is also optionally changeable by the user (details will be described later).

Figure 8A:
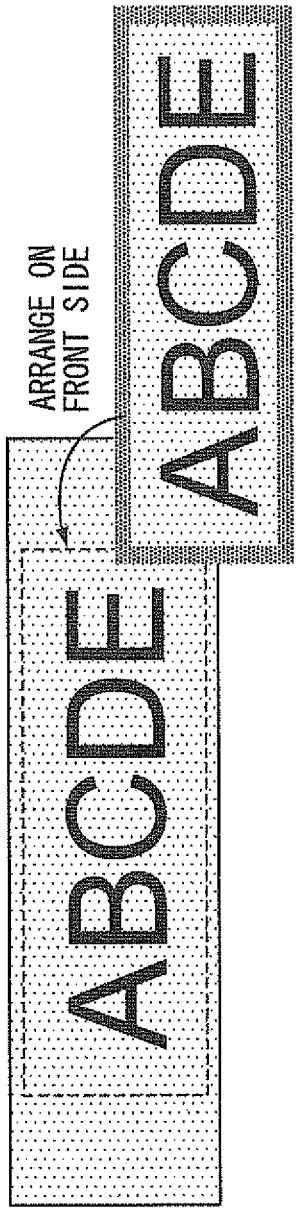
FIGS. 8A and 8B are conceptual diagrams illustrating the front side/back side determination of the character box based on accuracy of character recognition.
Figure 8B:
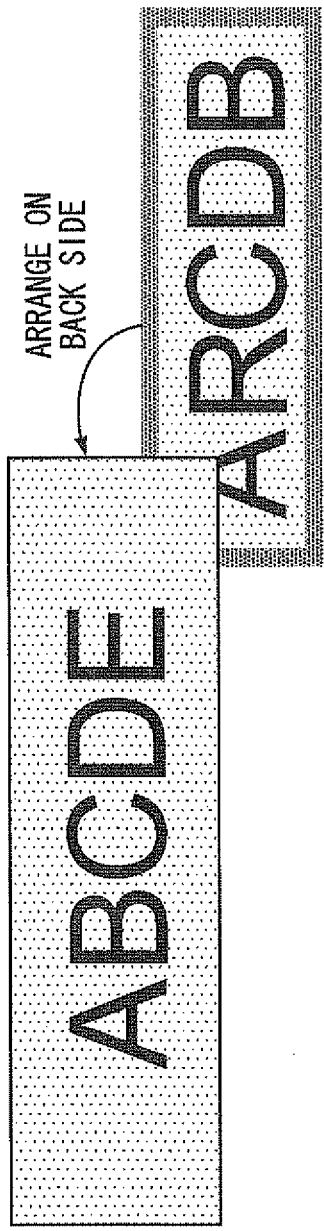

While a character (string) represented by character code data recognized in the character recognition processing is displayed in the character block, if the determination in step 100 is negative, as shown in FIG. 8B as an example, the character (string) displayed in the character block may be different from the character (string) mixed in the character mixed object to be processed (in the example shown in FIG. 8B, for example, while the character string "ABCDE" is mixed in the character mixed object to be processed, the character string "ARCDE" is displayed in the character block so that both character strings are different). Thus, if the determination in step 100 is affirmative, the processing proceeds to step 124 to determine that the arrangement position of the character box is the "back side" of the character mixed object to be processed before proceeding to step 128.

On the other hand, if the determination in step 100 is affirmative, as shown in FIG. 8A as an example, the character (string) displayed in the character block is likely to match the character (string) mixed in the character mixed object to be processed and thus, the processing proceeds to step 124 without determining that the arrangement position of the character box is the "back side" of the character mixed object to be processed. Steps 98 and 100 described above are an example of processing by the determining unit according to a fifth aspect.

In step 102, the size of characters recognized in the character recognition processing (step 44 in FIG. 2) on characters mixed in the character mixed object to be processed. The size of characters is also calculated individually for each character and thus, in step 102, the size of character is individually acquired for all characters mixed in the character mixed object to be processed and then, the maximum size of acquires sizes is calculated as the size of characters mixed in the character mixed object to be processed. In step 104 that follows, whether the size of characters mixed in the character mixed object to be processed acquired in step 102 is the determination threshold (determination threshold on the large size side) th7 concerning the size of characters of the eight determination thresholds th1 to th8 stored in the memory 16B or more.

Figure 9:
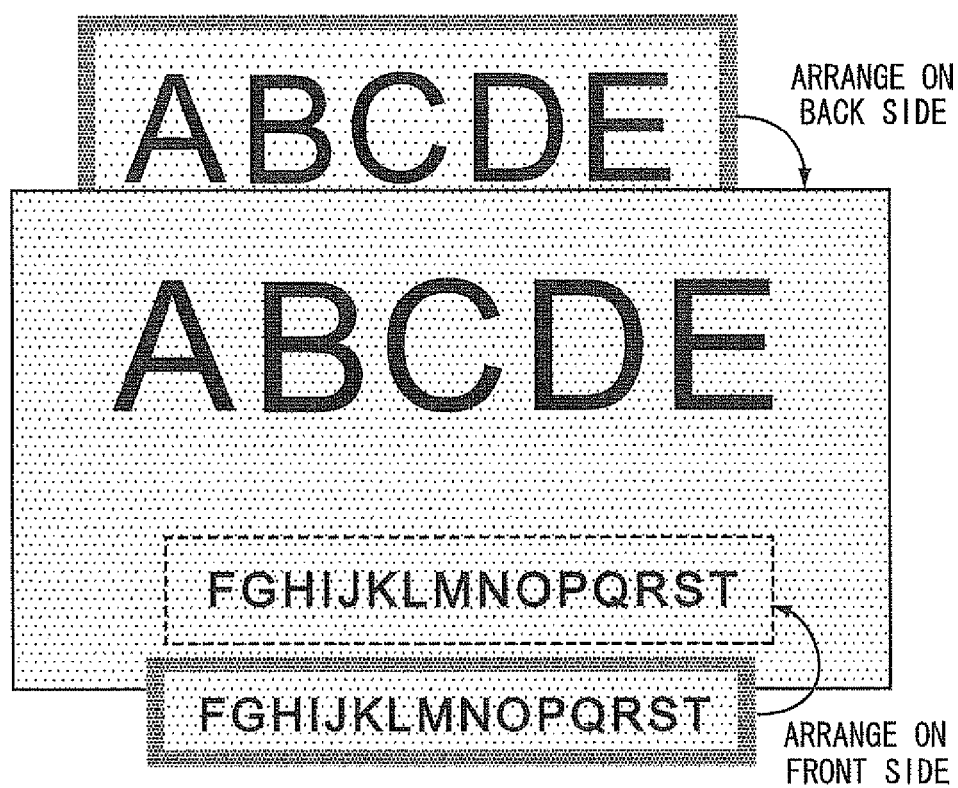
FIG. 9 is a conceptual diagram illustrating the front side/back side determination of the character box based on a font size of characters.

If, as shown in FIG. 9 as an example, the size of characters mixed in the character mixed object to be processed is large (if, as an example, 18 pt or more), the character (string) displayed in the character block is likely to be misaligned with regard to the character (string) mixed in the character mixed object to be processed due to a slight shift in recognition results in the character recognition processing or a difference of font types. Thus, if the determination in step 104 is affirmative, the processing proceeds to step 124 to determine that the arrangement position of the character box is the "back side" of the character mixed object to be processed before proceeding to step 128. Step 104 is an example of processing by the determining unit according to a sixth aspect.

If the determination in step 104 is negative, the processing proceeds to step 106 to determine whether the size of characters mixed in the character mixed object to be processed acquired in step 102 is less than the determination threshold (determination threshold on the small size side) th8 concerning the size of characters of the eight determination thresholds th1 to th8 stored in the memory 16B. If, as shown in FIG. 9 as an example, the size of characters mixed in the character mixed object to be processed is small (if, as an example, 6 pt or less), the character (string) displayed in the character block is less likely to be misaligned with regard to the character (string) mixed in the character mixed object to be processed and thus, if the determination in step 106 is affirmative, the processing proceeds to step 126 to determine that the arrangement position of the character box is the "front side" of the character mixed object to be processed before proceeding to step 128.

If the determinations in steps 104 and 106 are both negative, the processing proceeds to step 108. In the present exemplary embodiment, the determination thresholds th7 and th8 are also optionally changeable by the user (details will be described later). Steps 102 to 106 described above are an example of processing by the determining unit according to the sixth aspect.

In step 108, the number of characters and the number of lines of characters recognized in the character recognition processing (step 44 in FIG. 2) and mixed in the character mixed object to be processed. In step 110 that follows, whether the number of characters acquired in step 108 and mixed in the character mixed object to be processed is the determination threshold th3 concerning the number of characters of the eight determination thresholds th1 to th8 stored in the memory 16B or more. If the determination in step 110 is negative, the processing proceeds to step 112 to determine whether the number of lines of characters acquired in step 108 and mixed in the character mixed object to be processed is the determination threshold th4 concerning the number of lines of the eight determination thresholds th1 to th8 stored in the memory 16B or more.

Figure 10A:
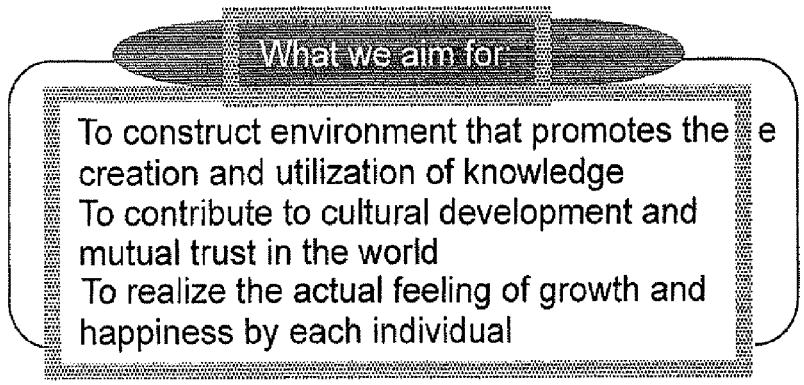
FIGS. 10A and 10B is a conceptual diagram illustrating the front side/back side determination of the character box based on the number of characters/number of lines.
Figure 10B:
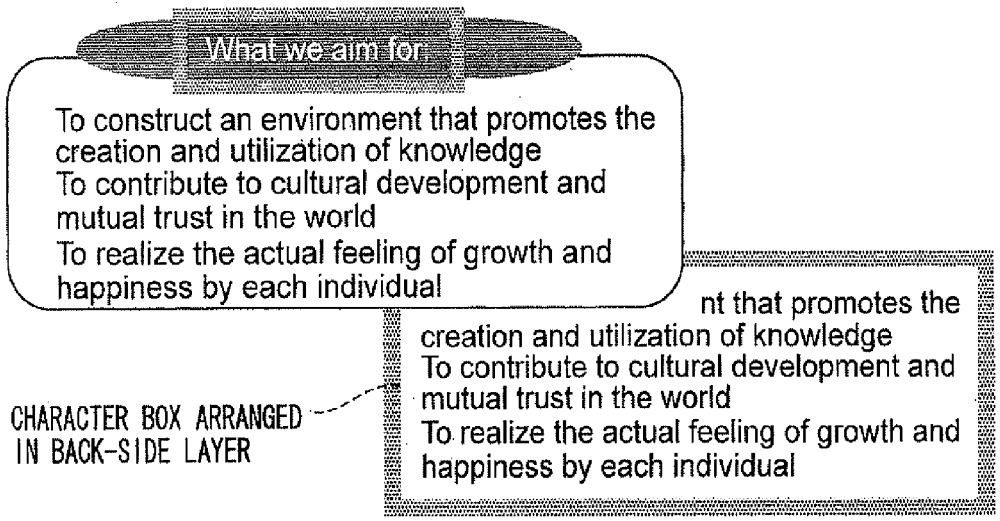

If, as shown in FIG. 10A as an example, the number of characters and the number of lines of characters mixed in the character mixed object to be processed are large (for example, if the number of characters is 50 characters or more, or the number of lines is five lines or more), the width of line or that of character of the character string displayed in the character block is likely to be misaligned with regard to the character string mixed in a character mixed object to be processed due to an influence of a slight difference of the font size, between lines, or the font type and the misalignment may cause the outward appearance to become worse due to partial overlapping of the character block deviated from the range of a character mixed object to be processed with another object. Thus, if the determination of one of steps 110 and 112 is affirmative, the processing proceeds to step 124 to determine that the arrangement position of the character box is the "back side" of the character mixed object to be processed (see also FIG. 10B) before proceeding to step 128.

If the determinations in steps 110 and 112 are both negative, the processing proceeds to step 114. In the present exemplary embodiment, the determination thresholds th3 and th4 are also optionally changeable by the user (details will be described later). Steps 108 to 112 described above are an example of processing by the determining unit according to a third aspect.

In step 114, the character color determined in the character recognition processing (step 44 in FIG. 2) of characters mixed in the character mixed object to be processed is acquired and the lightness of the character color mixed in the character mixed object to be processed is calculated based on the acquired character color. The lightness of the character color may be different from character to character and thus, in step 114, the lightness of the character color is calculated individually for all characters mixed in the character mixed object to be processed and an average value of the lightness calculated for each character is calculated as the lightness of the character color mixed in the character mixed object to be processed. In step 116 that follows, whether the lightness of the character color mixed in the character mixed object to be processed is calculated in step 114 is the determination threshold th5 concerning the lightness of characters of the eight determination thresholds th1 to th8 stored in the memory 16B or more.

Figure 11:
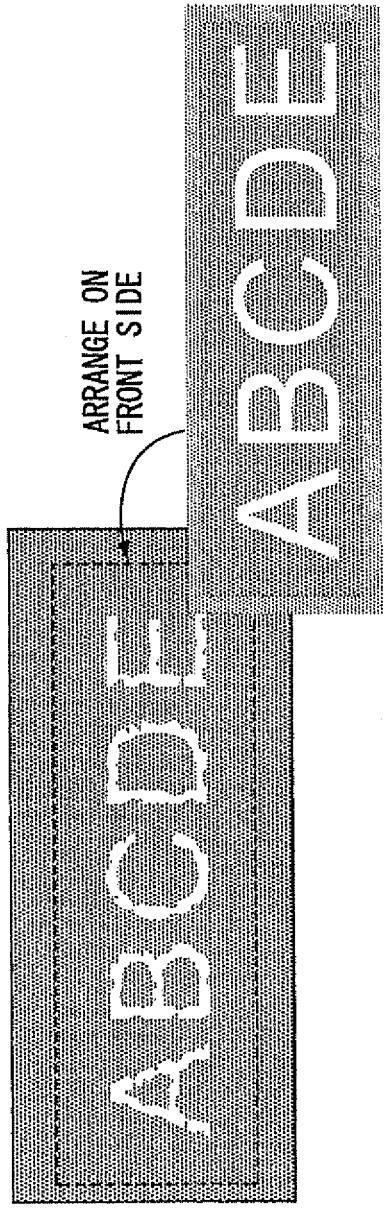
FIG. 11 is a conceptual diagram illustrating the front side/back side determination of the character box based on lightness of characters.

If the lightness of a character is higher than that of the background thereof in vectorization of the character mixed in an object whose object type is CG, as shown in FIG. 11 as an example, the outward appearance is frequently worsened due to damaged reproducibility of character edges like jaggier on character edges. A character with high lightness is recognized in character recognition if the background color of the character is a single color, that is, the object type of a character mixed object is "CG" and if the determination in step 116 is affirmative, the possibility of reproducibility of edges of characters mixed in the character mixed object may be determined to be high. Thus, if the determination in step 116 is affirmative, the processing proceeds to step 126 to determine that the arrangement position of the character box is the "front side" of the character mixed object to be processed before proceeding to step 128.

If the determination in step 116 is negative, the processing proceeds to step 118. In the present exemplary embodiment, the determination threshold th5 is also optionally changeable by the user (details will be described later). Steps 114 and 116 described above are an example of processing by the determining unit according to a fourth aspect.

In step 118, the background color determined in the character recognition processing (step 44 in FIG. 2) of characters mixed in the character mixed object to be processed is acquired and the lightness of the background color of characters mixed in the character mixed object to be processed and the distribution thereof are each calculated based on the acquired background color. The lightness of the background color may also be different from character to character and thus, in step 118, the lightness of the background color is calculated individually for all characters mixed in the character mixed object to be processed and a median value (the lightness value arranged in the middle when the lightness of the background color of each character is rearranged in ascending or descending order) of the lightness calculated for each character is calculated as the lightness of the background color of characters mixed in the character mixed object to be processed. Instead of the above median value, an average value may also be used. The distribution of lightness of the background color may be calculated by using, for example, the following formula (1):

$$\text{Distribution of lightness of background color} = \frac{\sum_{i=1}^{n}(B_i - B_o)^2}{n} \quad (1)$$

n is the total number of characters mixed in a character mixed object to be processed, $B_i$ is the lightness of background color of the i-th character, and $B_0$ is the average value of the lightness of background color of characters mixed in the character mixed object to be processed.

In step 120 that follows, whether the lightness of the background color of characters calculated in step 118 and mixed in the character mixed object to be processed is less than the determination threshold h1 concerning the lightness of the background color of the eight determination thresholds th1 to th8 stored in the memory 16B. If the determination in step 120 is negative, the processing proceeds to step 122 whether the distribution of the lightness of background color of characters calculated in step 118 and mixed in the character mixed object to be processed is the determination threshold h2 concerning the distribution of the lightness of background color of the eight determination thresholds th1 to th8 stored in the memory 16B or more.

If the lightness of background color of characters mixed in a character mixed object to be processed is low or the distribution of the lightness of background color is large, as shown in FIG. 12A as an example, the character mixed object to be processed may be judged to be "photo" or an object close to that. If the character block with some color set as the background color is arranged on the front side of an object of this type, as shown in FIG. 12B as an example, the outward appearance becomes worse because the background color of the character block and the color of the character mixed object. Also if the character block with the background set as transparent is arranged on the front side of "photo" or an object close to that, as shown in FIG. 12C as an example, the outward appearance becomes worse due to misalignment of the character (string) displayed in the character block with regard to the character (string) mixed in the character mixed object to be processed caused by a difference of the font type or font size.

Thus, if the determination of one of steps 120 and 122 is affirmative, the processing proceeds to step 124 to determine that the arrangement position of the character box is the "back side" of the character mixed object to be processed (see also FIG. 12D) before proceeding to step 128. If the determinations in steps 120 and 122 are both negative, the processing proceeds to step 126 to determine that the arrangement position of the character box is the "front side" of the character mixed object to be processed before proceeding to step 128. Steps 118 to 122 are an example of processing by the determining unit according to the second aspect.

In step 128, whether processing in step 90 and thereafter has been performed on all character mixed objects separated and extracted from the read document is determined. If the determination is negative, the processing returns to step 90 to repeat steps 90 to 128 until the determination in step 128 becomes affirmative. Accordingly, the above front/back determination is made for each of all character mixed objects separated and extracted from the read document. Then, when the above front/back determination is made for all character mixed objects separated and extracted from the read document, the determination in step 128 becomes affirmative to terminate the front/back determination processing.

Figure 4:
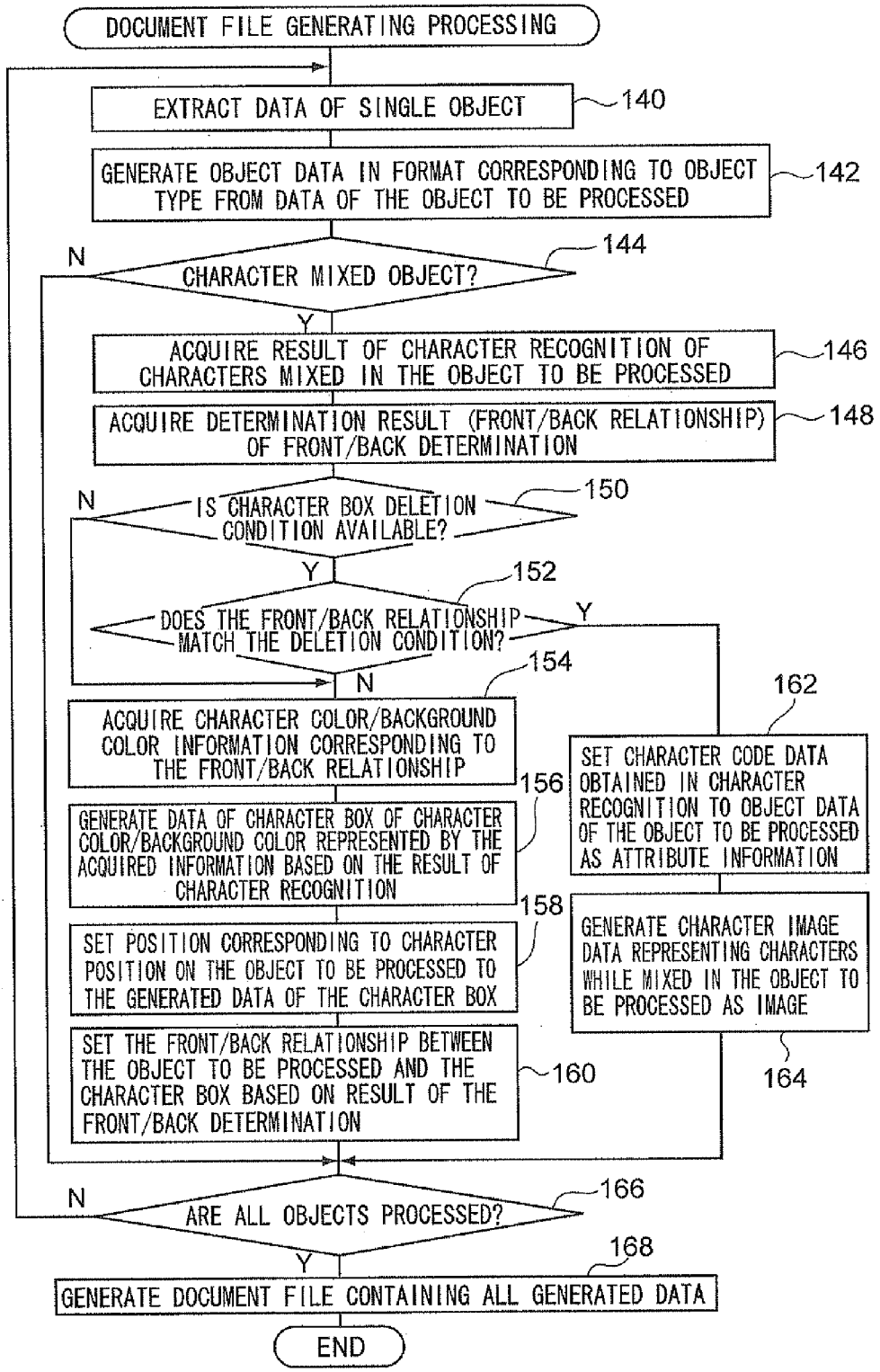
FIG. 4 is a flow chart showing content of document file generating processing.

Next, document file generating processing will be described with reference to FIG. 4. In the document file generating processing, first in step 140, data of a single object is extracted as an object to be processed from among objects separated and extracted from the read document in the object separating processing in step 42 of the reading/filing processing (FIG. 2). In step 142, based on the data of the object to be processed extracted in step 140, object data representing the object to be processed and in the format in accordance with the object type of the object to be processed (for example, document data containing character code data and in a format that may be handled by document processing software if the object type is "character", image data in a format that may be handled by image editing software if the object type is "photo" or "illustration (CG)", table data in a format that may be handled by spreadsheet software if the object type is "table", and vector data in a format that may be handled by graphics software if the object type is "line drawing") is generated.

In step 144 that follows, whether the object to be processed is a character mixed object is determined. If the determination is negative, the processing proceeds to step 166 and if the determination is affirmative, the processing proceeds to step 146 to acquire a processing result of the character recognition processing (step 44 in FIG. 2) on characters mixed in the character mixed object to be processed. In step 148, a determination result of the front/back determining processing (FIG. 3) on characters mixed in the character mixed object to be processed (result of determining which of the character mixed object to be processed and the character box to arrange on the front side: front/back relationship determination result) is acquired.

In step 150 that follows, setting information stored in the storage unit 16C is referred to and whether any deletion condition of the character box is set in the referred setting information is determined. In the present exemplary embodiment, the user is enabled to issue instructions to delete the corresponding character box when some deletion condition (one of "Character box is arranged on the front side of character mixed object", "Character box is hidden on the back side of character mixed object", and "Character box is arranged on the front side or the back side of character mixed object") is satisfied in advance and when such instructions are issued by the user, the instructions of the user are set to the setting information as deletion condition information. The determination in step 150 is made by determining whether deletion condition information is set to the setting information. If the determination in step 150 is negative, the processing proceeds to step 154 and if the determination in step 150 is affirmative, the processing proceeds to step 152 to determine whether the front/back relationship determination result of the character mixed object to be processed and the character box in the front/back relationship determining processing (FIG. 3) match the deletion condition provided in the deletion condition information.

If the determination in step 152 is negative, the processing proceeds to step 154 to acquire information about the character color/background color in accordance with a front/back relationship determination result in the front/back determining processing (FIG. 3) as information about the character color/background color of the character block. That is, in the present exemplary embodiment, setting information stored in the storage unit 16C contains character color/background color information providing the character color/background color when the front/back relationship determination result is "back side (Character box is hidden on the back side of character mixed object)" (in the character color/background color information, the character color is set to black and the background color to transparent as initial values (default values)) and if the front/back relationship determination result in the front/back determining processing (FIG. 3) is "back side", in step 154, the above character color/background color information is extracted from the setting information stored in the storage unit 16C. The character color/background color information is an example of color specifying information according to an eleventh aspect. If the front/back relationship determination result in the front/back determining processing (FIG. 3) is "front side (Character box is arranged on the front side of character mixed object)", in step 154, the character color/background color determined in the character recognition processing (step 44 in FIG. 2) on characters mixed in the character mixed object to be processed. Switching the character color/background color of the character box in accordance with the front/back relationship determination result in the front/back determining processing (FIG. 3) is an example by a generating unit according to a tenth aspect.

In step 156 that follows, information such as character code data, the font type, the font size, and positions determined in the character recognition processing (step 44 in FIG. 2) on characters mixed in the character mixed object to be processed is acquired and a character (string) represented by the acquired character code data is displayed in the acquired font type/size and in the character color acquired in step 154 and also generates data of the character box with a background region colored by the background color acquired in step 154. The data of the character box contains also character code data determined by the character recognition processing and if an operation to select the character box is performed while a document including the character box is displayed in a display or the like, character code data of the character (string) displayed in the character box may be copied (the copied character code data may further be pasted) and also if an operation to search for a character (string) is performed, the character (string) displayed in the character box is also searched.

In step 158, based on information acquired in step 156 and representing positions of characters in the character mixed object to be processed, the position where a character displayed in the character box is overlapped with a character mixed in the object to be processed is set as the arrangement position in the document of the character box whose data is generated in step 156. In step 160, information defining the front/back relationship between the character mixed object to be processed and the character box whose data is generated in step 156 is set in accordance with the front/back relationship determination result in the front/back determining processing (FIG. 3) before proceeding to step 166.

On the other hand, if the determinations in steps 150 and 152 are each affirmative (if a deletion condition of the character box is set and the front/back relationship determination result in the front/back determining processing (FIG. 3) matches the deletion condition), the processing proceeds from step 152 to step 162. In this case, (data of) the character box is not generated and the above-described copying/pasting of character code data using the character box and character searching are disabled.

Thus, in step 162, the character code data determined in the character recognition processing (step 44 in FIG. 2) on characters mixed in the character mixed object to be processed is acquired and the acquired character code data is set as attribute information to object data of the character mixed object to be processed. Accordingly, if an operation to cause a display or the like to display attribute information of the character mixed object is performed while a document containing the character mixed object to be processed is displayed in the display, character code data may be copied/pasted using the displayed attribute information. Step 162 described above is an example of processing by an attribute setting unit according to a fourteenth aspect.

In step 164 that follows, based on bitmap data or the like of the character mixed object to be processed, character image data (for example, image data in the format of png or the like) representing a character region while mixed in the character mixed object to be processed is generated and the front/back relationship between the generated character image data and the character mixed object to be processed is set in such a way that the character image data is displayed on the front side of the character mixed object to be processed before proceeding to step 166. In this case, the character image data may be used (such as copying/pasting), instead of character code data, while a document containing the character mixed object to be processed is displayed in the display. Instead of character image data in the format of png or the like, vector data representing a character in a vector format may be used.

Step 164 described above is an example of processing by the generating unit according to a thirteenth aspect. Executing only steps 162 and 164 (data of the character box is not generated) if the determination in step 152 is affirmative is an example of processing by the generating unit according to a twelfth aspect.

In step 166, whether the above processing has been performed on all objects separated and extracted from the read document in the object separating processing (step 42 in FIG. 2) is determined. If the determination is negative, the processing returns to step 166 and step 140 to step 166 are repeated until the determination in step 166 becomes affirmative. Accordingly, at least object data is generated for all objects separated and extracted from the read document (step 142) and for the character mixed object, processing in step 146 and thereafter is further performed thereon. If the determination in step 166 is affirmative, the processing proceeds to step 168 to generate a document file containing all data (object data of each object, data of the character box generated in step 156, and character image data generated in step 164) generated by the above processing before the document file generating processing being terminated.

Figure 5:
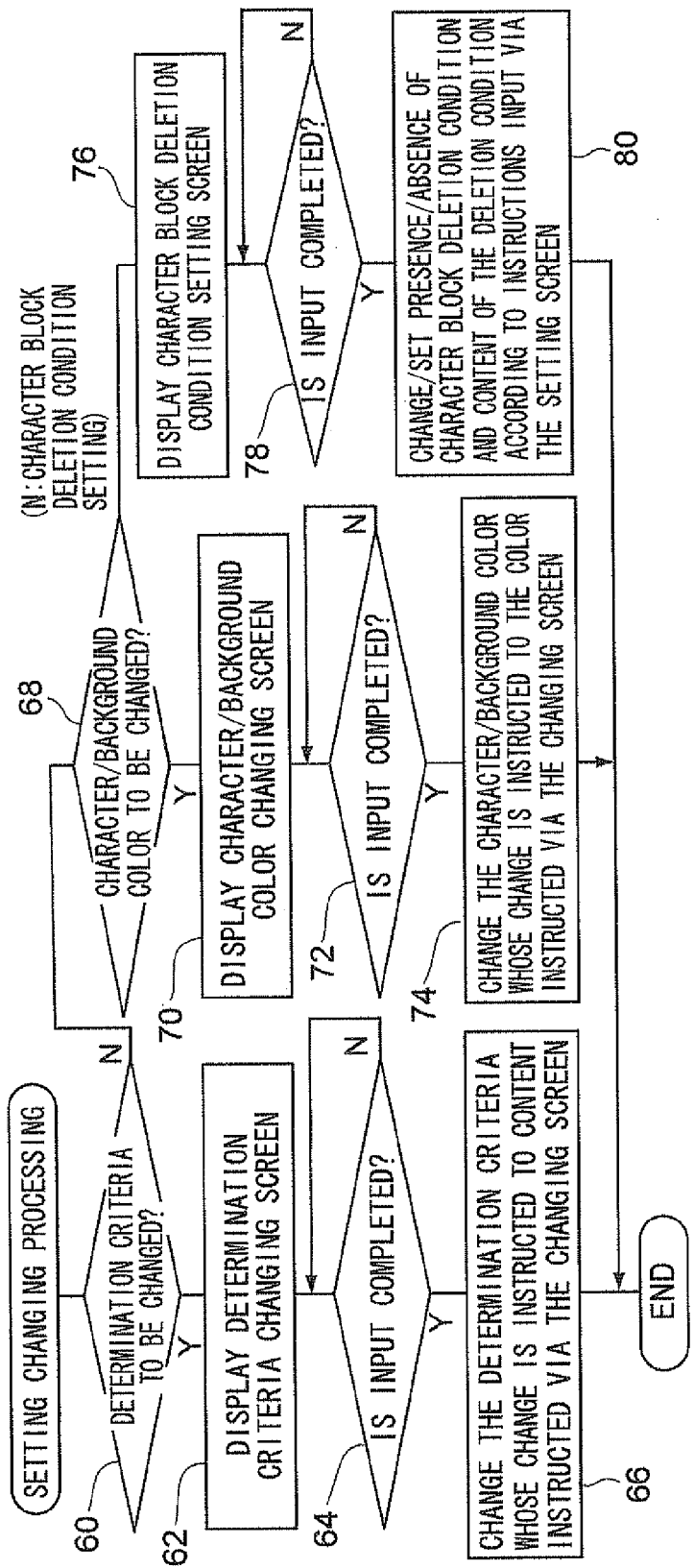
FIG. 5 is a flow chart showing content of setting changing processing.

Subsequently, setting changing processing performed when instructions to change determination criteria information referred to in the front/back determining processing or setting information referred to in the document file generating processing are issued by the user via the operation unit 22B of the operation panel 22 will be described with reference to FIG. 5.

In the setting changing processing, first in step 60, whether the change target specified by the user is determination criteria information referred to in the front/back determining processing is determined. If the determination is affirmative, the processing proceeds to step 62 to cause the display unit 22A of the operation panel 22 to display a determination criteria changing screen from which instructions to change arrangement rule information contained in the determination criteria information or the determination thresholds th1 to th8 may be issued. In step 64 that follows, whether input by the user is completed is determined and step 64 is repeated until the determination in step 64 becomes affirmative. When input by the user is completed, the determination in step 64 becomes affirmative and the processing proceeds to step 66 to change the information instructed by the user to change via the determination criteria changing screen the display unit 22A of the operation panel 22 is caused to display of each piece of information constituting the determination criteria information to the value (content) instructed by the user via the determination criteria changing screen before the setting changing processing being terminated. Step 62 to step 66 described above are an example of processing by a first changing unit according to a ninth aspect.

If the determination in step 60 is negative, the processing proceeds to step 68 to determine whether the change target specified by the user is character color/background color information referred to in the document file generating processing and contained in the setting information. If the determination is affirmative, the processing proceeds to step 70 to cause the display unit 22A of the operation panel 22 to display a character color/background color changing screen capable of issuing instructions to change the character color/background color information. In step 72 that follows, whether input by the user is completed and step 72 is repeated until the determination becomes affirmative. When input by the user is completed, the determination in step 72 becomes affirmative and the processing proceeds to step 74 to change the character color/background color information contained in the setting information to the value (content) instructed by the user via the character color/background color changing screen cause the display unit 22A of the operation panel 22 to display before the setting changing processing being terminated. Step 70 to step 74 described above are an example of processing by a second changing unit according to an eleventh aspect.

If the determination in step 68 is negative, the user is determined to desire to set a deletion condition for a character block and the display unit 22A of the operation panel 22 is caused to display a deletion condition setting screen capable of setting a deletion condition for a character block. In step 78 that follows, whether setting input of the deletion condition by the user is completed is determined and step 78 is repeated until the determination becomes affirmative. When setting input by the user is completed, the determination in step 78 becomes affirmative and the processing proceeds to step 80 to change the deletion condition information contained in the setting information to content instructed by the user via the deletion condition setting screen the display unit 22A of the operation panel 22 is caused to display before the setting changing processing being terminated.

In the above description, an aspect in which the front/back determination is made by using all the determination thresholds th1 to th8 and also the object type of a character mixed object is described, but the invention is not limited to this and it is needless to say that an aspect in which the front/back determination is made by using all the determination thresholds th1 to th8 and also a portion (at least one type) of the object types of a character mixed object is also included in the scope of the invention.

In the above description, an aspect in which the values of the determination thresholds th1 to th8 are switched based on whether the object type of a character mixed object is a target to be hidden by the character box is described, but the invention is not limited to this and, as described above, the object type of a character mixed object may be used alone to determine which of the character mixed object and the character box to arrange on the front side based on the object type of the character mixed object. This aspect corresponds to the invention of a seventh aspect.

In the above description, the rectangular character box is exemplified as a character block according to the invention, but the invention is not limited to this and it is needless to say that the character block according to the invention may have an outside shape other than the rectangular shape.

In the above description, an aspect in which a reading/filing program as an image processing program according to the invention is stored in the storage unit 16C of the body controller 16 of the image reading/printing apparatus 14 in advance is described, but an image processing program according to the invention may also be provided in a form in which the program is recorded in a recording medium such as a CD-ROM and DVD-ROM. Also in the above description, an aspect in which a reading/filing program as an image processing program according to the invention is executed by the storage unit 16C of the body controller 16 of the image reading/printing apparatus 14 is described, the invention is not limited to this and the program may be configured to be executed a different electronic device such as the terminal apparatus 24.

What is claimed is:

1. An image processing apparatus, comprising:
a character recognition component that performs character recognition on characters mixed in an entity based on image data obtained by reading, as an image, a document containing entities in which characters are mixed;
a determining component that determines, when document data is generated that contains first data representing the document and representing the entity in which the characters are mixed and second data containing character code data of the characters recognized by the character recognition component and representing a character block displaying the characters represented by the character code data, whether to hide the character block represented by the second data behind the entity represented by the first data or to display the character block represented by the second data in front of the entity represented by the first data when the document represented by the document data is displayed, based on at least one of lightness or distribution of the lightness of a background region around the characters of the entity, a number of characters or a number of lines of the characters in the entity, lightness of a region of the characters in the entity, accuracy of the character recognition by the character recognition component, a size of the characters in the entity, or a type of the entity; and
a generating component that generates the document data for which a front/back relationship of a display between the character block and the entity when the document is displayed has been set according to a determination result of the determining component.

2. The image processing apparatus of claim 1, wherein the determining component determines to hide the character block behind the entity if the lightness of the background region around the characters of the entity is less than a first threshold value or distribution of the lightness of the background region around the characters is equal to a second threshold value or more.

3. The image processing apparatus of claim 1, wherein the determining component determines to hide the character block behind the entity if the number of characters of the characters in the entity is equal to a third threshold value or more or if the number of lines of the characters in the entity is equal to a fourth threshold value or more.

4. The image processing apparatus of claim 1, wherein the determining component determines to display the character block in front of the entity if the lightness of the region of the characters of the entity is equal to a fifth threshold value or more.

5. The image processing apparatus of claim 1, wherein the determining component determines to hide the character block behind the entity if the accuracy of the character recognition by the character recognition component is less than a sixth threshold value.

6. The image processing apparatus of claim 1, wherein the determining component determines to hide the character block behind the entity if the size of the characters in the entity is equal to a seventh threshold value or more.

7. The image processing apparatus of claim 1, wherein the determining component determines to hide the character block behind the entity if the type of the entity is a type designated as a type for hiding the character block.

8. The image processing apparatus of claim 1, wherein the determining component determines whether to hide the character block behind the entity or to display the character block in front of the entity based on a result of comparison with at least one threshold value of the lightness or the distribution of the lightness of the background region around the characters of the entity, the number of characters or the number of lines of the characters in the entity, the lightness of the region of the characters in the entity, the accuracy of the character recognition by the character recognition component, or the size of the characters in the entity, and if the type of the entity is a type designated as a type for hiding the character block, the at least one threshold value is changed in advance so that a probability of determining to hide the character block behind the entity is higher than when the type of the entity is determined not to be the type designated as a type for hiding the character block hidden.

9. The image processing apparatus of claim 1, wherein:
the determining component compares at least one of the lightness or the distribution of the lightness of the background region around the characters of the entity, the number of characters or the number of lines of the characters in the entity, the lightness of the region of the characters in the entity, the accuracy of the character recognition by the character recognition component, the size of the characters in the entity, or the type of the entity, with a threshold value or with setting information stored in a storage component and determines, based on a comparison result, whether to hide the character block behind the entity or to display the character block in front of the entity; and
the image processing apparatus further comprises a first changing component that changes the threshold value or the setting information stored in the storage component in accordance with instructions from a user wherein instructions to change the threshold value or the setting information are issued from the user via an instruction component.

10. The image processing apparatus of claim 1, wherein, if the determining component determines to hide the character block behind the entity, the generating component generates, as the second data, data representing the character block that respectively displays the characters represented by the character code data and the background region around the characters in a predetermined character color and background color and, if the determining component determines to display the character block in front of the entity, the generating component generates, as the second data, data representing the character block that respectively displays the characters represented by the character code data and the background region around the characters in colors identical or similar to the character color of the characters while mixed in the entity or a background color of the background region.

11. The image processing apparatus of claim 10, wherein:
color specifying information, specifying the character color and the background color of the character block when the determining component determines to hide the character block behind the entity, is stored in the storage component in advance; and
the image processing apparatus further comprises a second changing component that changes the color specifying information in accordance with instructions from a user in a case in which instructions to change at least one of the character color or the background color of the character block are issued from the user via an instruction component after the determining component determines to hide the character block behind the entity.

12. The image processing apparatus of claim 1, further comprising:
an input receiving component that receives input from the user of removal instruction information that instructs removal of the second data from the document data when the determination result of the determining component is a specific determination result, wherein
the generating component generates data as the document data from which the second data is removed when the input of the removal instruction information is received by the input receiving component and the determination result of the determining component matches the specific determination result provided in the removal instruction information.

13. The image processing apparatus of claim 12, wherein, when data is generated as the document data from which the second data is removed, the generating component generates character image data representing the characters while mixed in the entity as an image and generates data as the document data that contains the generated character image data, and sets the front/back relationship of the display between a character image and the entity when the document is displayed so that the character image representing the character image data is displayed in front of the entity when the document is displayed.

14. The image processing apparatus of claim 1, wherein:
at least the first data has a format capable of setting any information as attribute information of the entity; and
the image processing apparatus further comprises an attribute setting component that sets the character code data of the characters recognized by the character recognition component to the first data as the attribute information of the entity.

15. A non-transitory computer readable storage medium, the storage medium storing a program of instructions executable by the computer to function as an image processing apparatus that includes:
a character recognition component that performs character recognition on characters mixed in an entity based on image data obtained by reading, as an image, a document containing entities in which characters are mixed;
a determining component that determines, when document data is generated that contains first data representing the document and representing the entity in which the characters are mixed and second data containing character code data of the characters recognized by the character recognition component and representing a character block displaying the characters represented by the character code data, whether to hide the character block represented by the second data behind the entity represented by the first data or to display the character block represented by the second data in front of the entity represented by the first data when the document represented by the document data is displayed, based on at least one of lightness or distribution of the lightness of a background region around the characters of the entity, a number of characters or a number of lines of the characters in the entity, lightness of a region of the characters in the entity, accuracy of the character recognition by the character recognition component, a size of the characters in the entity, or a type of the entity; and
a generating component that generates the document data for which a front/back relationship of a display between the character block and the entity when the document is displayed has been set according to a determination result of the determining component.

* * * * *